United States Patent [19]
Neny

[11] 4,233,962
[45] Nov. 18, 1980

[54] PANELS FOR COLLECTING SOLAR ENERGY

[75] Inventor: Michel Neny, Paris, France

[73] Assignee: Societe d'Investissement pour le Developpement des Appareils Menagers, Montrouge, France

[21] Appl. No.: 897,547

[22] Filed: Apr. 18, 1978

[30] Foreign Application Priority Data

Apr. 20, 1977 [FR] France ............... 77 11894

[51] Int. Cl.³ .............................................. F24J 3/02
[52] U.S. Cl. ................................. 126/450; 126/447
[58] Field of Search ............... 126/270, 271, 450, 448, 126/449; 237/1 A; 165/170, 171, 168

[56] References Cited

U.S. PATENT DOCUMENTS

| | | | |
|---|---|---|---|
| 3,916,871 | 11/1975 | Estes | 126/271 |
| 3,965,887 | 6/1976 | Gramer | 126/271 |
| 3,980,071 | 9/1976 | Barber, Jr. | 126/450 |
| 4,062,351 | 12/1977 | Hastwell | 126/271 |
| 4,078,546 | 3/1978 | Zani | 126/450 |
| 4,098,259 | 7/1978 | Barber, Jr. et al. | 126/450 |
| 4,131,111 | 12/1978 | Hopper | 126/450 |

FOREIGN PATENT DOCUMENTS 938012  9/1963  United Kingdom ............. 126/271

Primary Examiner—James C. Yeung
Attorney, Agent, or Firm—Cushman, Darby & Cushman

[57] ABSTRACT

A solar energy collecting panel for heating by solar radiation a liquid circulating in a section of piping and constituted by a flat rectangular box thermally closed by a cover transparent to solar radiation and containing the said section of piping. The said box is constituted by a stamped metal sheet whose surface is less than 1 m squared and also contains a stamped copper tray in intimate contact with the piping section, the said tray supporting by itself the transparent cover and being thermally spaced from the box, the insulating pad being constituted by a in situ moulded block of rigid foam. Such a panel is intended to be used for feeding a central heating system and/or a hot water distribution system, especially for household purposes or swimming pools.

16 Claims, 7 Drawing Figures

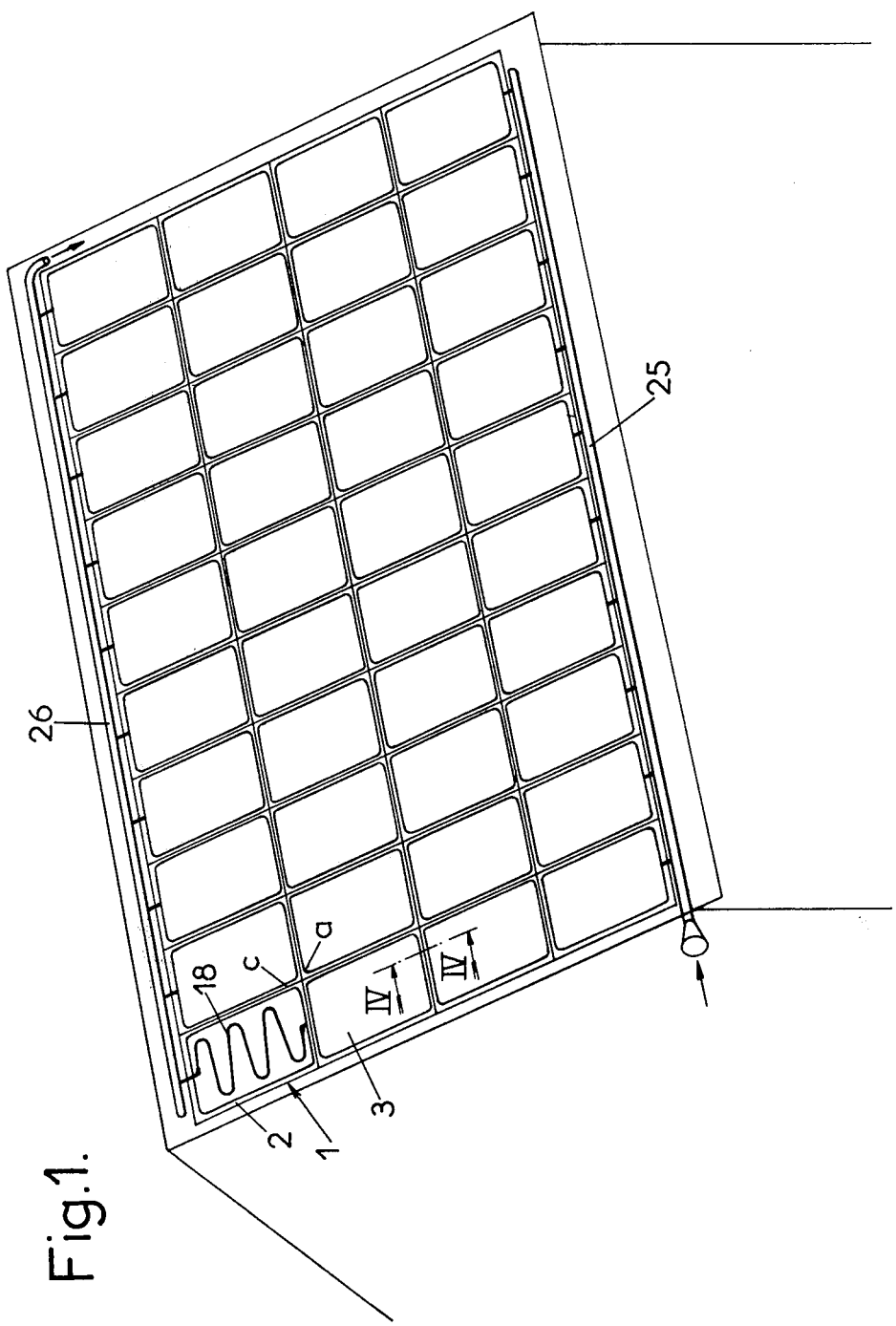

PANELS FOR COLLECTING SOLAR ENERGY

BACKGROUND OF THE INVENTION

The invention relates to panels for collecting solar energy to effect the heating, by solar radiation, of a liquid circulating in a section of piping and enclosed by a flat rectangular insulated box containing the said section of piping and closed by a cover transparent to solar radiation.

It equally concerns assemblies composed of several such collecting panels justaposed with their respective sections of piping interconnected.

It is known that liquid (generally water, with or without antifreeze) heated by such collecting panels or assemblies is advantageously used for feeding a central heating system and/or a hot water distribution system, especially for household purposes, or again for heating swimming pools, etc.

The invention has as a primary object to render collecting panels of the type in question better adapted to their function and in particular more robust, and easier to fabricate, handle and instal.

It is characterised essentially in that the box of such a collecting panel is constituted by a stamped metal sheet, especially one based on aluminium, whose surface is less than 1 meter sqd.

In the preferred embodiments, attention is directed to one or the other of the following features, considered separately or in combination;

the section of piping contained in the box of a collector being, in intimate contact within this box with a plate of thermally conductive material parallel to the bottom of the box and separated from this bottom by an insulating pad, the said plate constitutes the bottom of a tray less deep than the box, being obtained like the box by stamping and contained within this box, the section of piping contained in the box of a collector of the type in question being, in intimate contact within this box with a plate of thermally conductive material parallel to the bottom of the box and separated from this bottom by an insulating pad, the said insulating pad is constituted by a rigid block of foam, preferably of polyurethane, moulded directly by injection into the spaced delimited between the box and plate, the lateral walls of the interior tray are extended towards the exterior by rims parallel to the bottom of this tray and serving to support the transparent cover, preferably with the interposition of an adhesive, the edge of this rim being maintained spaced from the wall of a box, which surrounds this edge, by a space provided with a thermally insulating material, in a collecting panel of the preceding type, the side walls of the box are extended towards the exterior by flat rims parallel to the bottom of this box and the edges of the internal tray are off-set, relative to these rooms, by a distance d, measured in the direction perpendicular to this bottom, slightly greater than the thickness of the transparent cover, in a collecting panel of the preceding type, the box presents at each of its four corners a recessed step delimited externally by a flat ledge, of generally triangular or analogous form, off-set by the distance d towards the bottom of the said box relative to the flat peripheral rims of this box so that each of these ledges can serve to support one of the four corners of the transparent cover, preferably with the interposition of an adhesive, the section of piping of each box is mounted fixedly in a groove formed in the bottom of the tray during the stamping of the latter, this groove being preferably open downwardly in such a manner that the section of piping fits on the lower face of the bottom of the tray, the positioning of the plate relative to the bottom of the box is determined, before formation of the foam injected in situ, by means of rigid prefabricated spacers in this same foam and by means of the rigid ends of the section of piping, which are themselves fixed on the side walls of the box by means of rigid members of thermally insulating material, the transparent cover is constituted of cast glass and has an exterior surface of low reflectivity, especially fluted, corrugated, or provided with any other desirable roughness or unevenness, the collecting panel is prefabricated, with its transparent cover mounted tightly on the box.

The invention includes, apart from these principal features, certain other features which are preferably used at the same time and which are dealt with more specifically below.

DESCRIPTION OF THE DRAWINGS

In the following, preferred embodiments of the invention are described in a non-limiting manner with reference to the accompanying drawings.

FIG. 1 of these drawings, shows in perspective a roof one side of which is constituted by a frame work covered with solar energy collecting panels according to the invention.

DETAILED DESCRIPTION OF THE INVENTION

Figure 3:
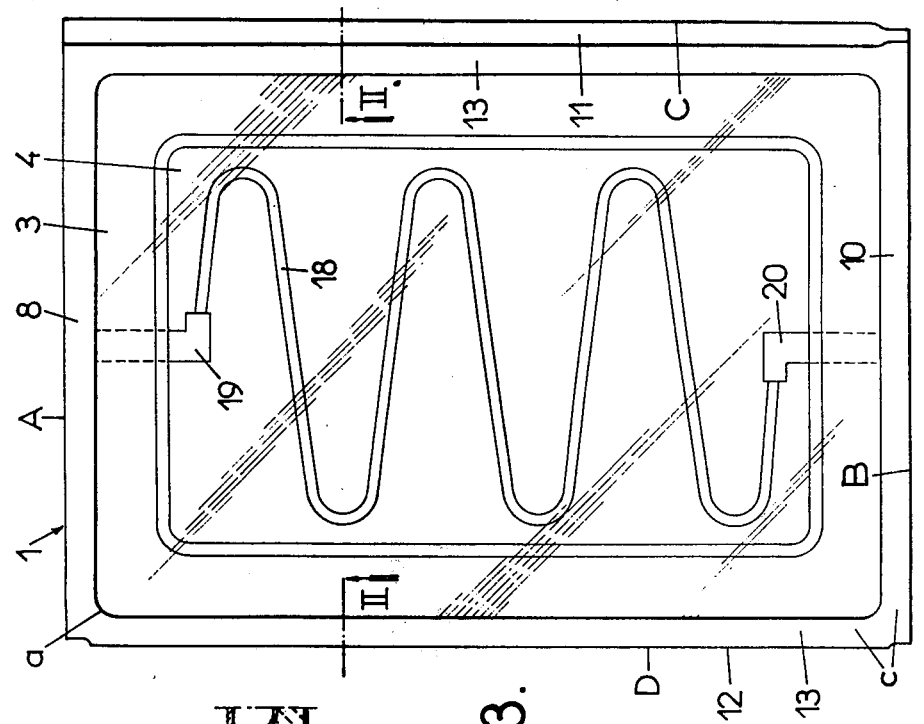
FIGS. 2 and 3 show such a panel respectively in section along lines II—II, FIG. 3, and in plan.
Figure 2:
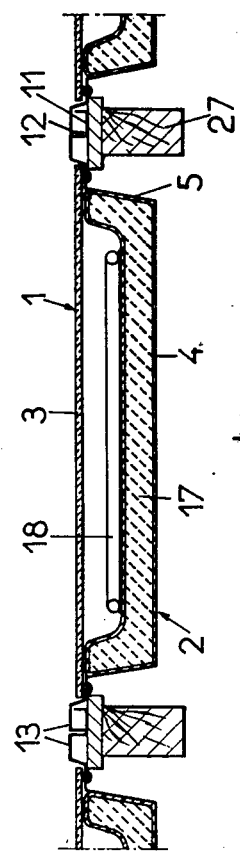
Figure 4:
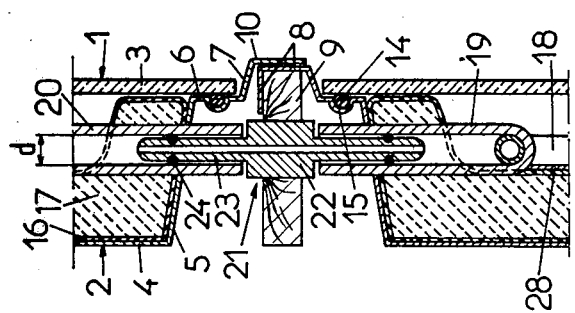
FIG. 4 shows on an enlarged scale, in section along line IV—IV, FIG. 1, the connection zone of two of the above panels, the connection of these two panels equally being according to the invention.

Referring now to FIGS. 1-4, each panel 1 is constituted by a box 2 having the general form of a flat and rectangular tray closed by a cover 3 transparent to solar radiation.

The advantages of the invention are achieved where the surface of each panel is relatively small, that is to say less than 1 meter sqd., preferably of the order of 0.5 meter sqd.

Each panel is arranged in such a manner that it can serve by itself as a covering element in the manner of a tile and hence can be used directly by roofers in place of conventional slates or tiles.

Because of the relatively reduced dimensions of the panels considered, the covers 3 thereof can be of plates of cast glass with rounded edges and corners, whose external surfaces, fluted, corrugated or provided with any other desirable roughness, are of low reflectivity and hence of low dazzle, this constituting an important advantage for the external appearance of the assembly.

The covers 3 may equally be constituted with advantage by glass reinforced with filaments, fibres or fabrics, or by tempered glass, which is particularly resistant to shocks and deformations: certain of these glasses can support the weight of a roofer, which can be important in certain cases.

One may equally use to constitute the cover 3 a transparent material other than glass, strengthened or not, treated or coated to ensure high transparency to solar energy.

Other advantages also resulting from the smallness of the surfaces considered for the transparent covers 3 are their lightness and the fact that their risk of breakage is greatly reduced. This permits the prefabrication of the boxes in a factory with their covers already mounted on them, whereas using large panels involves use of plate glass or windows on site.

Such prefabrication is suited to long runs, this constituting a supplementary factor of economy.

It goes without saying that the lightness and the smallness of the prefabricated panels considered, equipped with their covers (15 kg alone for a surface of 0.6 meter sqd) makes possible and easier their handling by individual and non-skilled roofers, even on roofs, frequently difficult to access.

Each box 2 is composed of a thin metallic sheet deformed by stamping and including a flat rectangular bottom and four flat side walls 5 preferably diverging slightly to facilitate disengagement of the stamping tool.

The sheet in question is preferably based on aluminium, especially an aluminium-magnesium alloy known under reference A-G5 of "stamping" quality and of 1 mm thickness.

It is to be emphasized that only the relatively small boxes considered herein are suited to fabrication by stamping, and as a result is applicable to mass production: from a sheet based on aluminium and of thickness of the order of 1 millimeter, a press of 350 t permits the fabrication of stamped boxes of 0.6 meters sqd.; for dimensions above 1 m sqd, this stamping procedure is not feasible in practice, but other procedures then feasible (extrusion, bending ...) entail the complementary operations of welding or others hardly suited to automatic manufacture and lead to relatively fragile products.

In the embodiment of FIGS. 1 to 4, the edges of the walls 5 most remote from the bottom 4 are lengthened successively by flat rims 6 extending towards the exterior parallel to the bottom 4, rims suitable to serve as supports for the transparent cover 3, then by flat edges 7 which diverge slightly like walls 4 and are adapted to surround securely the said covers.

Furthermore these further edges 7 are themselves lengthened externally, respectively:

at the upper horizontal surface A, by a marginal angle piece 8 adapted to overlap a horizontal element 9 of the frame, such as a wooden batten so as to ensure engagement of the corresponding panel on this element, at the lower horizontal surface B, by a lipped end parallel to the bottom 4 and adapted to overlay the engaging angle piece 8 of an immediately adjacent panel, and for the two inclined surfaces C and D, by a channel 11 and by a member 12 adapted to fit into the corresponding channel 11 at the inclined side C of the immediately adjacent panel.

The channel 11 and the member 12 are preferably connected respectively to the corresponding edges 7 by flat surfaces 13 parallel to the bottom 4. The flat surfaces form, with the coplanar wing of the angle piece 8 and the lip 10, a continuous slightly projecting surround which is only visible from the exterior of the roofing after it has been constructed.

As visible on the drawing, the internal corners of the surrounds are slightly rounded at a and in the same manner as the corners of the panes constituting the covers 3, which are themselves set securely within these surrounds.

The tightness of the closure of each box against bad weather is ensured by the interposition of appropriate joints 14 between the rims 6 and the covers 3, the precise positioning of these joints being obtained advantageously by their fitting in channels 15 in the said rims.

These joints may be formed in the material to provide an irreversible assembly, in the manner of a weld, between each cover and the box 2 that it closes: which may be advantageously based on silicone and cast in place, as well known in the production of aquaria.

All of the interior surface of each box 2 is covered with a relatively thick pad of an insulating material itself enclosed in a water-proof coating 16. On the flat base of the shallow trough thus provided is disposed a sheet 28 of thermally conductive material, such as copper, treated (for example by blackening) so as to absorb most of the solar radiation which penetrates into the box through the transparent cover 3.

Finally the section of piping 18 is made of thermally conductive material, such as copper, and is contained within the box thus defined in thermal contact with the sheet 28, which may be advantageously brazed to this sheet and treated in the same manner as the latter.

This section 18 is of such form that, when the panel is inclined with two of its opposed sides (preferably the smallest) horizontal, the ends of the said section traverses the upper side wall 5 of the box through a first tube 19 and the other the lower side wall 5 through a second tube 20 coaxial to the first tube, so that the circulation of a liquid (generally water with or without antifreeze) within the section from the first to the second end can occur, under gravity, to facilitate draining and refilling. An interesting form for such a section is that of a sinusoidal serpentine shape composed of straight portions inclined relative to the horizontal sides, connected end to end by curved portions in the form of an arc of a circle each extending through a little less than 180°.

The external connection between the lower tube 20 of one "tile" and the upper tube 19 of the tile immediately below in the roofing is effected very rapidly and efficiently on installation of the tiles by the roofer.

One advantageously uses to this end a connector 21 (FIG. 4) constituted by a central coupler 22 of external diameter greater than the internal diameter d of the tubes to be connected, the said coupler being extended axially at its two ends by two hollow fingers 23 with rounded ends and external diamters slightly less than d.

The cylindrical external surface of each finger is grooved by an annular groove in which is mounted a toroidal seal 24 of external diameter slightly greater than d.

It will be understood that the internal channels of the fingers and coupler extend mutually to form a single cylindrical channel from one extremity to the other of the connector.

The desired connection between the two tubes 19 and 20 is then effected very easily by simple axial introduction of the two ends of the connector into the respective two tubes on installation.

To form a roof by means of the solar energy collector panels defined above, termed "tiles" below, one proceeds as follows.

One provides a frame including:

a series of parallel rafters 27 extending along the line of greater slope of the roof to be constructed and spaced one from the other by a distance slightly less than the overall width of a tile, and a network of horizontal laths or battens spaced one from the other by a distance slightly less than the overall length of the tile.

One commences by placing on the base of this frame work a first row of tiles with their angle pieces 8 overlapping the corresponding batten 9, the engagement thus effected being completed by nailing.

One connects the lower tubes 20 of these tiles to a common admission tube 25 extending horizontally along the bottom of the frame, this connection itself being effected in any manner desired, especially by means of connectors 21 of the type described above.

It will be understood that one takes care that the lateral member 12 of each of the tiles laid should be introduced into the adjacent lateral channel 11 of the neighbouring tile which has been laid just previously.

One introduces the connectors 21 into the upper tubes 19 of the different tiles thus put in place.

One then lays the following row of the roofing, the lower lips 10 of each of the tiles of this following row overlaying the upper angle pieces 8 of the corresponding tiles of the lower row at the same time as the tubes 20 of the upper tiles overlap the upper fingers 23 of the connectors 21 to effect the connection between the sections of piping 18 of the superposed tiles.

One proceeds in the same manner for each following row and, after laying the highest row, one connects the upper sections 19 of these tiles of the last row with a horizontal collective outlet tube 26 extending along the ridge of the roofing. The roofing is then finished.

One can of course provide all desirable elements, in the style of those described above, to complete the roof along the length of the ridge or in any other particular zone of this roof (end edges, along the gutters . . . ). As readily visible on FIG. 1, the only parts of the tiles which are visible from the exterior are practically the panes of cast glass constituting the covers 3 and the slightly projecting surrounds c which encircle these panes.

The assembly of piping sections 18 and the feed and evacuation tubes 25 and 26 constitute a heat generator adapted to heat a liquid (generally water with added antifreeze) in forced circulation, according to the arrows of FIG. 1, from the entry of the tube 25 to the exit of the tube 26.

This generator is itself connected in a heating circuit designed especially for the heating of premises situated under the roof and/or for the heating of water, household or otherwise, for the users of these premises. The generator considered could be associated with means for storing the heat and/or to other generators designed to assist it or even to be substituted therefor during periods when the solar radiation is insufficient.

Figure 5:
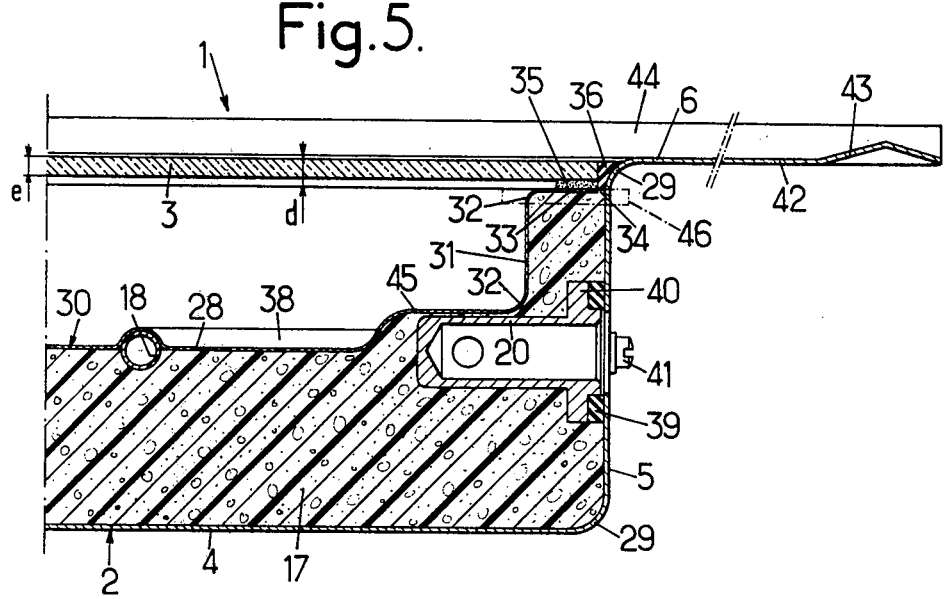
FIG. 5 shows in partial section in a vertical plane parallel to one of its sides, another solar energy collecting panel according to the invention.
Figure 6:
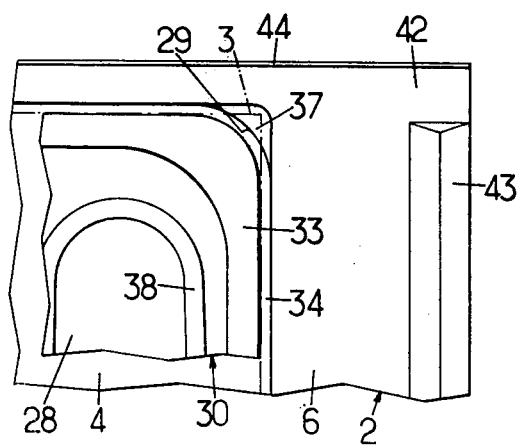
FIG. 6 shows in plan one of the four corners of this panel.
Figure 7:
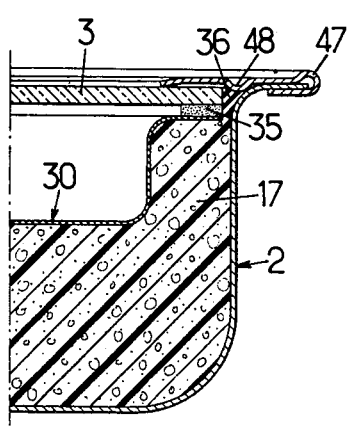
FIG. 7 shows, in partial section similar to that of FIG. 5, a yet further solar energy collecting panel according to the invention.

Referring to FIGS. 5 to 7, there are now described two other particularly advantageous embodiments of solar energy collecting panels according to the invention: elements analogous to those which have already been described are designated on these figures by the same reference numerals as before, and the various features described in relation to the first embodiment remain applicable to the following.

The four side walls of the stamped box are here connected between themselves and the bottom 4 by rounded portions 29 and they are likewise connected by rounded corner portions 29 to flat rims 6 which extend them externally.

In addition:

the sheet 28 constitutes here the bottom of a tray 30 formed by stamping just like the external box 2, this tray supports itself and the transparent cover 3, and the said tray is disposed within the box 2 with no direct contact therewith, being essentially supported and spaced in the latter by the insulating pad 17 itself which is constituted by a rigid block of foam moulded in the factory.

The stamped tray whose bottom is constituted by the sheet 28 has, like the box 2, very slightly diverging side walls 31 connected to one another and to the bottom by rounded corner portions 32.

These side walls are further extended externally by flat rims 33 to which they are likewise connected by rounded corner portions 32.

These rims are of such a size that the tray can be introduced with a little play (a few millimeters) into the box: the width of the narrow closed space 34 between the edges of the said rims 33 and the side walls 5 is filled with a thermally insulating material as will be referred to again later.

The rims 33 are slightly sunken within the box: they are off-set relative to the flat rims 8, in the direction perpendicular to the bottoms 4 and 28, by a distance d which is slightly greater than the thickness e of the glass constituting the transparent cover 3.

These rims 33 which support the said glass, are sealed with an adhesive ribbon 35, constituted for example by foam impregnated with glue known under the name PLASTAZOTE.

Because of the off-set d between the rims 6 and 33 the external surfaces of the rims 6 and of the glass 3 are at practically the same level (see FIG. 5).

The continuity of the connection between the two level surfaces is insured by means of an air-tight joint 36 of the type of joint 14 above, cast in the space separating the edge of glass 3 from the opposed portion of the box.

This continuity and levelness facilitates the running off of rain water and also washing.

At the four corners of the box are provided gussets or stepped portions 37 (FIG. 6) slightly recessed within this box and adapted to support, with the interposition of an above adhesive ribbon 35, the four respective corners, delimited by right angles, of glass 3.

To this end each of the steps has a flat ledge disposed at the same level as the upper surfaces of the rims 33 and whose configuration is essentially that of a curvilinear triangle delimited by two identical straight sides connected at right angles and by a quarter of a circle tangential to these two sides. The quarter of a circle as heretofore described defines the profile of the side wall 5 of the box (or more precisely of a rounded corner portion 29 connected to this side) below the level of the considered ledge of the step whereas the two straight portions define the said profile above the said level. The sheet constituting the tray is chosen to be suited to easy stamping; it is for example a sheet of deoxidised red copper 0.35 mm thick.

Its depth is of course less than that of the box and is for example of the order 25 to 30 millimeters when the box is of the order of 80 millimeters. Like the external box 2, the stamped tray 30, of reduced dimensions (that is to say showing an overall surface lower than 1 m sqd) possesses great mechanical rigidity and is well suited to automatic production.

To effect intimate thermal contact between the bottom 28 of the tray and the piping section 18, one impresses in this bottom, during stamping of the tray, channels or grooves 38 extending along the path of the said section to advantageously provide a semi-circular profile, thereafter the section is seated in these grooves to ensure intimate contact between them in any desirable manner, for example by brazing.

Whilst these grooves 38 can be open upwards or downwards, it is preferred for them to open downwards as illustrated in FIG. 5 so that the piping section 18 is carried on the lower face of the bottom 28. This arrangement avoids the ends of the said piping section 18 traversing the tray, which would necessitate the provision of special sealing means at the points of traverse to avoid undesirable infiltration of water or other material into the insulating material 7 or breakage of the glass 3.

Fixing of cylindrical tubes, such as 20, to which are connected the ends of the piping section 18, on the upper and lower side walls 5 of the box, in the middle of the width of these walls, is effected firmly and so as to avoid formation of any thermal link between each tube and the wall. This is achieved this particularly by means of a washer 39 of thermally insulating material pressed into the wall and a collar 40 of the tube by means of screw 41 constituted of a polyamide (such as that known under the name RILSAN) and engaging with female threads of the same composition.

The pad 17 is here constituted by a rigid block of foam (for example of polyurethane) moulded by direct injection into the volume comprised between the box 2 and the tray 30.

The substances to form this foam, hardenable on polymerisation, are introduced into appropriate orifices formed preferably in the side wall of the box, other orifices being provided to permit escape of air contained in the moulding volume and closure means, for example adhesive bands, being placed to close at least provisionally the vents 34.

It is best to position the tray 30 correctly within the box 2 before the injection, but before this injection the tray cannot be supported by the pad 17, because the latter is not yet formed. Initial support is provided by means of rigid spacers (not shown) which are advantageously constituted of the same foam as that to be formed. These spacers may be constituted as prisms, particularly cubes, interposed directly between the two bottoms 4 and 28, in positions selected so that the flow of the foam-generating substances is not disturbed and can fill easily the whole volume of the mould space. The support is completed by the rigid mounting, described above, of the two tubes 19 and 20 on the upper and lower walls 5 of the box. The small volume of foam which reaches the vents 34 constitutes the thermal insulation whose presence is here required.

It is to be emphasized that the rigid block of foam integrally filling the space between the two stamped metal elements 2 and 30 confers on the double bottomed panel thus constituted a remarkable mechanical resistance.

The panel is thus totally self-carrier and is suited perfectly to direct mounting on rafters or battens extending under the rims 6 of two only of the four sides, opposed and parallel, all other intermediate support being unnecessary.

In FIGS. 5 and 6:

A lip 42 extending the flat rim 6 of the lower side of the box, is adapted to overlay the edge of the upper side of the collecting panel situated immediately below the panel in question in the roof, this lip including a raised portion 43 in the form of four-pitched roof, formed by stamping at the same time as the box and adapted to avoid the rising of water by capillarity as well as the retention of moisture under the lip.

It will be apparent that vertical flange 44 extending externally a lateral rim 6 of the box, a flange adapted to cooperate with complementary means to give a seal against rainfall.

A rib 45 is provided in the bottom of tray 30, during its stamping, to accommodate the volume taken up by the tube 20, A small vent tube 46 is illustrated providing communication between the ambient atmosphere and the internal volume of the collector comprised between the tray 30 and the glass 3 so as to avoid excessive internal pressure due to excessive heating of the air in this volume.

These collector panels have numerous advantages compared to those previously known, in particular in that their structural integrity, ease of handling and laying, and ease of manufacture because of the stamping and the injection moulding suit them to automatic mass production, and in the efficiency since the internal thermo conductive tray 30 in which the heat is accumulated before being transmitted to circulating liquid in the piping section 18 remains wholly thermally isolated from its environment.

Whilst the above collector panels are suited particularly as elementary tiles for forming a roofing by juxtaposition of a plurality of these tiles on a framework, one can equally use them, without departing from the invention, on a support other than a roof framework, such a support for example being an already existing roof, a wall, a terrace, or even a simple support disposed horizontally a small distance above the ground, the collector then being simply placed with its back to the support.

In these last cases the panels can constitute independent units not especially arranged so as to overlap one another and useable alone or in groups of connected units, but not necessarily juxtaposed: in this case the rims 6 may be narrowed as shown in FIG. 7 and overlapped by a clip 47 pressed resiliently against the rims, such a clip being for example constituted by a bent metal strip based on aluminium and extending particularly just over the glass, a depression 48 advantageously being provided at the hermetic joint 38 to avoid its untimely disengagement.

The invention is in no way limited to those embodiments specifically described; it embraces on the contrary, all variations.

I claim:

1. A solar energy panel for providing heat from solar radiation by heating a liquid circulating in a section of piping in a flat rectangular box formed by the stamping of a metal sheet,
    wherein said box is thermally closed by a cover transparent to solar radiation, and said piping section is in intimate contact in said box with a plate comprised of thermally conductive material disposed in said box parallel to the bottom of said box, and wherein said plate is separated from the bottom of said box by an insulating pad, said plate forming a tray having diverging side walls that is formed by stamping a thermally conductive metal sheet to a configuration that is less deep than said rectangular box, wherein the side walls of said tray are extended towards the exterior by rims parallel to the bottom of said tray and supporting by themselves a transparent cover, the edge of said rims maintaining a space from the wall of said box, wherein said space is filled with a thermally insulating material, and wherein the side walls of said box are extended towards the exterior by flat rims parallel to the bottom of said box and the rims of said tray are off-set, relative to said flat rims of said box, by a distance d that is slightly greater than the thickness of said transparent cover, and wherein said box has at each of its four corners a recessed step delimited externally by a flat ledge, of generally triangular or analogous form, off-set by the distance d towards the bottom of said box relative to said flat rims of said box so that each of said ledges serves to support with the interposition of insulation one of the four corners of said transparent cover.

2. A collecting panel according to claim 1, wherein the piping section of each box is mounted securely in a groove formed in the bottom of the tray on stamping of the latter, wherein said groove is open downwardly so that the piping section is carried by the lower face of the bottom of the tray.

3. A collecting panel according to claim 1, wherein the positioning of the plate relative to the bottom of the box is effected, before formation of the molded foam, by means of prefabricated rigid spacers of the same foam and by means of the rigid ends of the piping section which are fixed on the side walls of said box by means of rigid members of a thermally insulating material.

4. A collecting panel according to claim 1, wherein the transparent cover is comprised of cast glass and has an external surface of low reflectivity, preferably fluted, corrigated or provided with any desirable roughness.

5. A collecting panel according to claim 1, wherein the upper and lower side walls of the box are extended respectively by a marginal engaging angle piece and by an overlapping lip parallel to the bottom of the box.

6. A collecting panel according to claim 1, wherein the two inclined and parallel side walls of the box are extended respectively by a mutually engageable channel and a turned down portion.

7. A collecting panel according to claim 1, wherein the side walls of the box are extended by relatively narrow peripheral flat rims, overlapped by clips clipped down.

8. A collecting panel according to claim 1, wherein said panel is prefabricated with its transparent cover sealed tightly on said box.

9. The solar energy collecting panel for providing heat from solar radiation comprising, (a) a flat substantially rectangular box formed by stamping a metal sheet;

(b) a cover transparent to solar radiation;

(c) means for supporting said transparent cover and for thermally isolating said cover from said box;

(d) a thermally conductive tray formed by stamping a metal sheet wherein said tray is less deep than said box and disposed in said box intermediate the bottom of said box and said cover; and (e) an insulating pad for supporting and thermally isolating said tray from said box, said insulating pad formed by the injection molding of a foam into a space between said box and said tray, wherein said box has at each of its four corners a recessed step delimited externally by a flat ledge, of a generally triangular shape, off-set by the distance d towards the bottom of said box relative to the flat peripheral rims of said box so that each of said ledges serve to support with the interposition of insulation one of the four corners of said transparent cover.

10. A solar energy collecting panel for providing heat from solar radiation according to claim 9, wherein said stamped metal sheet forming said rectangular is about 1 millimeter thick.

11. A solar energy collecting panel for providing heat from solar radiation according to claim 9, wherein said means for supporting and thermally isolating said transparent cover from said box includes flanges stamped in the outside perimeter of said box and includes an insulating material disposed between said box and said cover.

12. A solar energy collecting panel for providing heat from solar radiation according to claim 9, wherein said means for supporting and thermally isolating said transparent cover from aid box is provided by supporting said cover with said tray with an insulating material interdisposed between said tray and said cover.

13. A solar energy collecting panel for providing heat from solar radiation according to claim 9, wherein said tray includes side walls which are extended towards the exterior by rims which are substantially parallel to the bottom of said tray and supports said transparent cover, the edge of said rims maintaining a space from the wall of the box wherein said space is filled with a thermally insulating material.

14. A solar energy collecting panel for providing heat from solar radiation according to claim 9, wherein the side walls of the box are extended towards the exterior by flat rims parallel to the bottom of said box and said rims of said internal tray are off-set relative to those rims by a distance d that is slightly greater than the thickness of said transparent cover.

15. A solar energy collecting panel for providing heat from solar radiation according to claim 9, wherein said flat substantially rectangular box contains a section of piping.

16. A solar energy collecting panel for providing heat from solar radiation according to claim 15, wherein the positioning of the tray relative to the bottom of the box is effected before the formation of the molded foam by means of prefabricated rigid spacers of the same foam and by means of the rigid ends of the piping section which are fixed on the side walls of said box by means of rigid members of a thermally insulating material.

* * * * *